(12) United States Patent
Shin et al.

(10) Patent No.: US 12,339,705 B2
(45) Date of Patent: *Jun. 24, 2025

(54) DISPLAY DEVICE

(71) Applicant: Samsung Display Co., LTD., Yongin-si (KR)

(72) Inventors: Jaiku Shin, Hwaseong-si (KR); Yunjae Kim, Cheonan-si (KR); Sung Chul Choi, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,311

(22) Filed: Apr. 12, 2023

(65) Prior Publication Data
US 2023/0244271 A1 Aug. 3, 2023

Related U.S. Application Data

(63) Continuation of application No. 17/220,071, filed on Apr. 1, 2021, now Pat. No. 11,656,655.

(30) Foreign Application Priority Data

Jul. 8, 2020 (KR) .......................... 10-2020-0083916

(51) Int. Cl.
*G06F 1/16* (2006.01)
*H04M 1/02* (2006.01)

(52) U.S. Cl.
CPC .......... *G06F 1/1641* (2013.01); *G06F 1/1643* (2013.01); *H04M 1/0268* (2013.01)

(58) Field of Classification Search
CPC .... G06F 1/1641; G06F 1/1643; G06F 1/1652; H04M 1/0268; H04M 1/0216; Y02E 10/549; G09F 9/301; H10K 77/111
See application file for complete search history.

(56) References Cited

U.S. PATENT DOCUMENTS

| | | |
|---|---|---|
| 10,164,208 B2 | 12/2018 | Lee et al. |
| 10,541,373 B2* | 1/2020 | Park ........................ G06F 1/1652 |
| 10,686,246 B2 | 6/2020 | Park et al. |
| 11,513,415 B2* | 11/2022 | Hashimoto ........... G06F 1/1652 |
| 11,610,520 B2* | 3/2023 | Park ....................... G06F 1/1641 |
| 12,014,018 B2* | 6/2024 | Tatsuno ................ G06F 1/1643 |

(Continued)

FOREIGN PATENT DOCUMENTS

| | | |
|---|---|---|
| KR | 1020150051054 A | 5/2015 |
| KR | 1020180079091 A | 7/2018 |

(Continued)

*Primary Examiner* — Rockshana D Chowdhury
(74) *Attorney, Agent, or Firm* — CANTOR COLBURN LLP

(57) ABSTRACT

A display device includes a display panel including a first non-folding area, a folding area, and a second non-folding area that are arranged in a first direction, a first support layer which is disposed below the display panel and in which a plurality of first holes overlapping the first non-folding area and the second non-folding area are defined, and a reinforcing part disposed below the first support layer. The reinforcing part includes a reinforcing layer disposed below the first support layer and a plurality of dummies extending from the reinforcing layer and disposed into the plurality of first holes.

20 Claims, 11 Drawing Sheets

(56) References Cited

U.S. PATENT DOCUMENTS

| | | | |
|---|---|---|---|
| 2016/0084994 A1* | 3/2016 | Namkung | G02B 1/04 |
| | | | 359/488.01 |
| 2018/0341290 A1* | 11/2018 | Sim | G06F 1/1658 |
| 2019/0131553 A1* | 5/2019 | Park | G06F 1/1652 |
| 2019/0267430 A1 | 8/2019 | Choi et al. | |
| 2019/0334114 A1* | 10/2019 | Park | H10K 77/111 |
| 2019/0355927 A1 | 11/2019 | Park | |
| 2020/0166970 A1* | 5/2020 | Yeom | G06F 1/1618 |
| 2020/0209998 A1 | 7/2020 | Shin et al. | |
| 2020/0389986 A1* | 12/2020 | Tsuchihashi | G06F 3/041 |
| 2021/0118337 A1* | 4/2021 | Park | G09F 9/301 |
| 2021/0168929 A1* | 6/2021 | Wang | H05K 1/028 |
| 2021/0174711 A1* | 6/2021 | Cho | H10K 59/40 |
| 2021/0311525 A1* | 10/2021 | Seo | H04M 1/0268 |
| 2021/0365132 A1* | 11/2021 | Jung | G06F 1/1643 |
| 2021/0385959 A1* | 12/2021 | Wang | G06F 1/1656 |
| 2021/0407344 A1* | 12/2021 | Lee | H10K 59/878 |

FOREIGN PATENT DOCUMENTS

| | | |
|---|---|---|
| KR | 1020190101584 A | 9/2019 |
| KR | 1020190124844 A | 11/2019 |
| KR | 1020190131154 A | 11/2019 |
| KR | 1020200084495 A | 7/2020 |

\* cited by examiner

DISPLAY DEVICE

This application is a continuation application of U.S. patent application Ser. No. 17/220,071 filed on Apr. 1, 2021, which claims priority to Korean Patent Application No. 10-2020-0083916, filed on Jul. 8, 2020, and all the benefits accruing therefrom under 35 U.S.C. § 119, the entire contents of which are hereby incorporated by reference.

BACKGROUND

(1) Field

The disclosure herein relates to a display device, and more particularly, to a display device which is foldable and unfoldable about a folding axis.

(2) Description of the Related Art

Electronic apparatuses that provide an image to a user, such as smart phones, digital cameras, laptop computers, navigation units and smart televisions include display devices for displaying the image. Such a display device generates an image and provides the image to the user via a display screen.

With the technological development for the display device, various types of display devices have been developed. For example, various flexible display devices which may be deformable, foldable or rollable in curved shapes are being developed. The flexible display devices having diversely deformable shapes are easy to carry and improve user's convenience.

A foldable display device among the flexible display devices includes a display module that is foldable about a folding axis extending in one direction. The display module is both foldable and unfoldable about the folding axis.

SUMMARY

Embodiments of the invention provide a flexible display device including a support layer suitable to drive a digitizer module.

An embodiment provides a display device includes a display panel including a first non-folding area, a folding area, and a second non-folding area that are arranged in a first direction, a first support layer which is disposed below the display panel and in which a plurality of first holes overlapping the first non-folding area and the second non-folding area are defined, and a reinforcing part disposed below the first support layer. The reinforcing part includes a reinforcing layer disposed below the first support layer and a plurality of dummies extending from the reinforcing layer and disposed into the plurality of first holes.

In an embodiment, a display device includes a display panel including a first non-folding area, a folding area, and a second non-folding area that are arranged in a first direction, a first support layer which is disposed below the display panel, and in which a first hole overlapping each of the first and second non-folding areas and a second hole overlapping the folding area are defined, and a plurality of dummies disposed in the first hole.

In an embodiment, a display device includes a display panel which is foldable, a digitizer module disposed below the display panel, a first support layer which is disposed below the digitizer module, and comprises a first section and a second section, each having a first hole defined therein, and a third section disposed between the first section and the second section and having a second hole defined therein, a first shielding sheet disposed below the first section, and a second shielding sheet disposed below the second section and spaced apart from the first shielding sheet.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
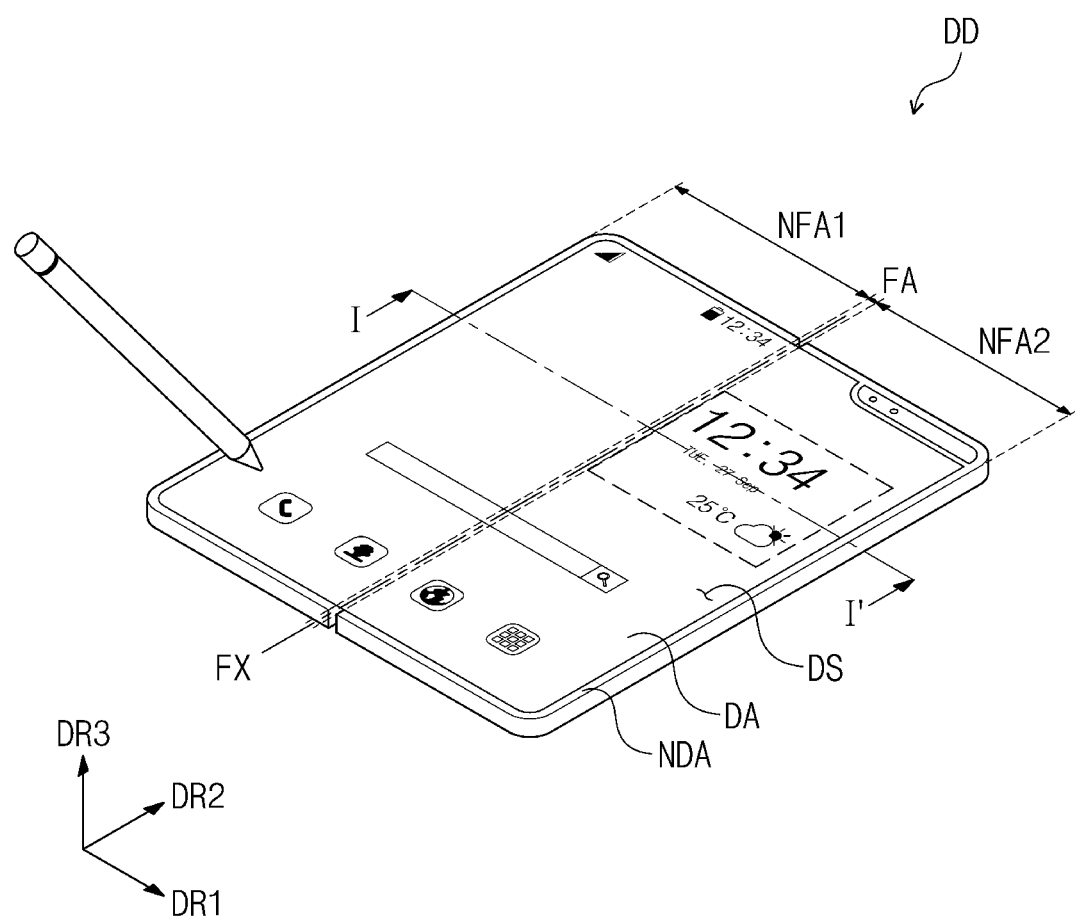
FIG. 1 is a perspective view illustratively showing an embodiment of a display device.

It will be understood that when an element (or an region, a layer, a portion, or the like) is referred to as being related to another element such as being "on," "connected to" or "coupled to" another element in the specification, it can be directly disposed on, connected or coupled to another element mentioned above, or intervening elements may be disposed therebetween. In contrast, when an element (or n region, a layer, a portion, or the like) is referred to as being related to another element such as being "directly on," "directly connected to" or "directly coupled to" another element in the specification, no intervening elements are disposed therebetween.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like numbers refer to like elements throughout. Also, in the drawings, the thicknesses, ratios, and dimensions of the elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

Also, terms such as "below," "lower," "above," and "upper" may be used to describe the relationships of the components illustrated in the drawings. These terms have a relative concept, and are described on the basis of the directions indicated in the drawings.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the term "includes" or "comprises," when used in this specification, specify the presence of stated features, integers, steps, operations, elements, components, or a combination thereof, but do not preclude the presence or addition of one or more other features, integers, steps, operations, elements, components, or combinations thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings.

Figure 2:
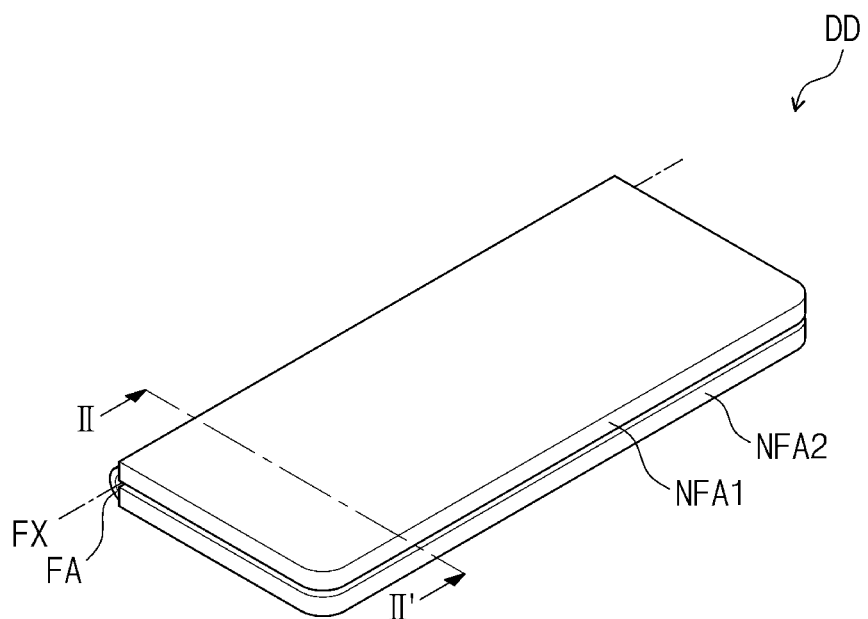
FIG. 2 is a perspective view illustratively showing the display device illustrated in FIG. 1 which is folded.

FIG. 1 is a perspective view illustratively showing an embodiment of a display device DD. FIG. 2 is a perspective view illustratively showing the display device DD illustrated in FIG. 1 which is folded.

Referring to FIG. 1, a display device DD may be a device for generating and/or displaying an image. In an embodiment, for example, the display device DD may be a mobile phone. However, a type of the display device DD is not limited thereto. The display device DD may be another electronic apparatus for generating and/or displaying an image.

The display panel DD may have two short sides extending along a first direction DR1 and long sides extending along a second direction DR2 which crosses the first direction DR1. When viewed in a plan view, the display device DD may have a rectangular shape. However, the planar shape of the display device DD is not limited thereto. In an embodiment, for example, the display device DD may have a circular shape and a polygonal shape among planar shapes.

In this specification, the meaning of "when viewed in a plan view" or "in a plan view" may represent a view along a third direction DR3 perpendicular or normal to a plane defined by the first direction DR1 and the second direction DR2 crossing each other.

The display device DD may include a display area DA and a non-display area NDA which is adjacent to the display area DA. In an embodiment, the non-display area NDA may surround the display area DA without being limited thereto. The display area DA may be a planar area at which an image is displayed. A display surface DS may define a top surface of the display device DD at the display area DA. The display device DD may provide an image to outside the display device DD, through the display surface DS. The non-display area NDA may be a planar area at which the image is not displayed. The non-display area NDA may be a bezel area of the display device DD.

According to an embodiment, the display device DD may be flexible, so as to be a flexible display device. In an embodiment, for example, the display device DD may be a foldable display device. The display device DD may be foldable and unfoldable about a folding axis FX.

In particular, the display device DD which is unfolded may include a first non-folding area NFA1, a folding area FA and a second non-folding area NFA2, which are arranged in order along the first direction DR1. The folding area FA may be disposed between the first non-folding area NFA1 and the second non-folding area NFA2. The folding area FA may be a planar area at which the display device DD and various components thereof are foldable. A non-folding area may be a planar area at which the display device DD and various components thereof are unfoldable and/or which remain flat even when the display device DD is folded at the folding area FA.

In the embodiment, the display device DD is illustratively shown as having one of the folding area FA and two non-folding areas. However, the numbers of the folding area FA and the non-folding areas are not limited thereto. The display device DD may include more than two, for example, a plurality of non-folding areas and a plurality of folding areas respectively disposed between the non-folding areas.

Referring to FIG. 2, the display device DD may be folded about the folding axis FX. The folding axis FX may be a virtual line parallel to the second direction DR2. Here, in the display device DD which is folded, a top surface of the display device DD at the first non-folding area NFA1 may face a top surface of the display device DD at the second non-folding area NFA2. Accordingly, the display surface DS of the display device DD may not be exposed to the outside. That is, the display device DD may be in-folded.

However, a folding operation of the display device DD is not limited thereto. In an embodiment, for example, the display device DD may be folded about a folding axis FX parallel to the first direction DR1. Also, the display device DD may be out-folded so that portions of the display surface DS face away from each other so as to be exposed to outside the display device DD.

Figure 3:
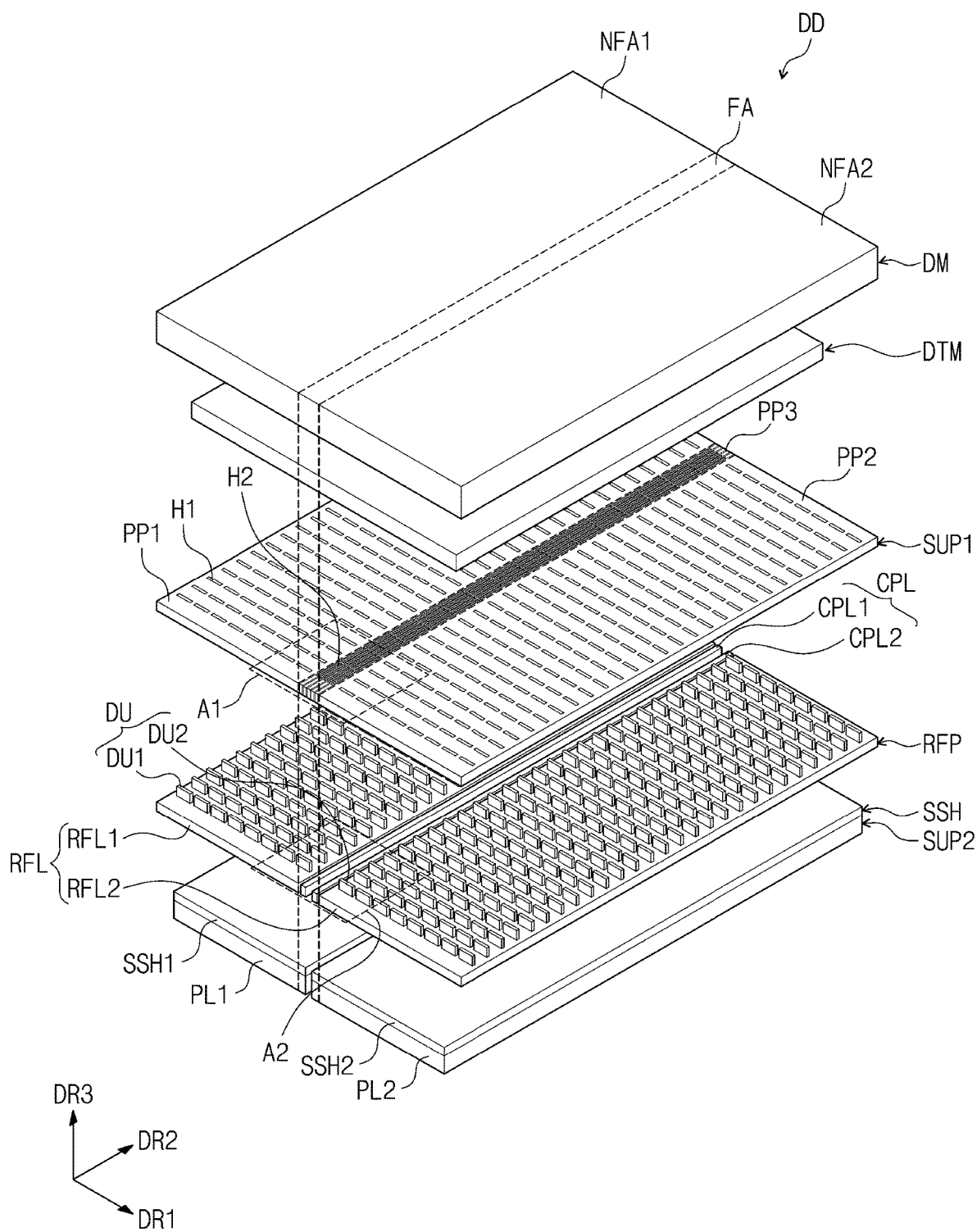
FIG. 3 is an exploded perspective view illustratively showing an embodiment of the display device illustrated in FIG. 1.
Figure 4:
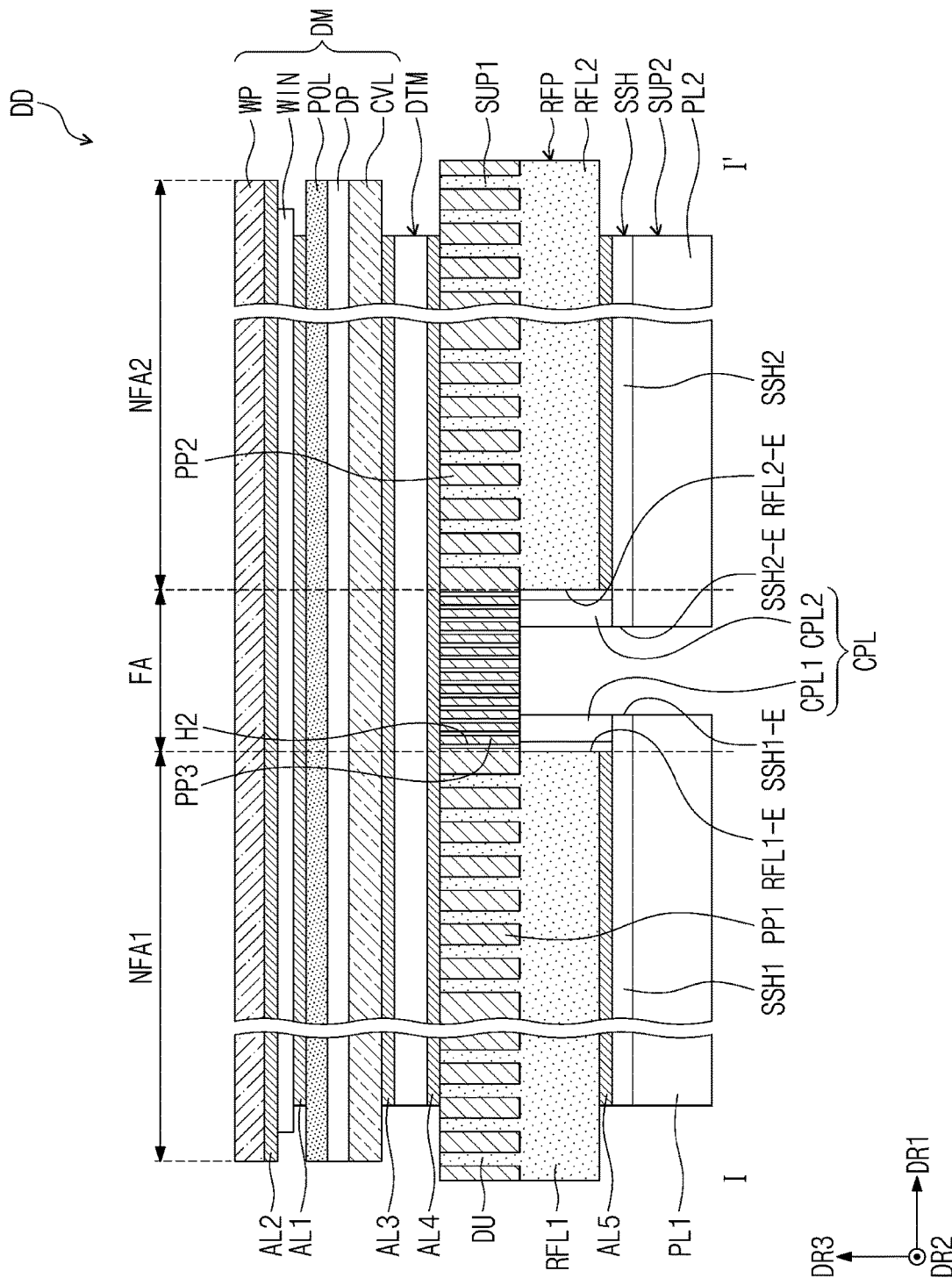
FIG. 4 is a cross-sectional view taken along line I-I' of FIG. 1.
Figure 5:
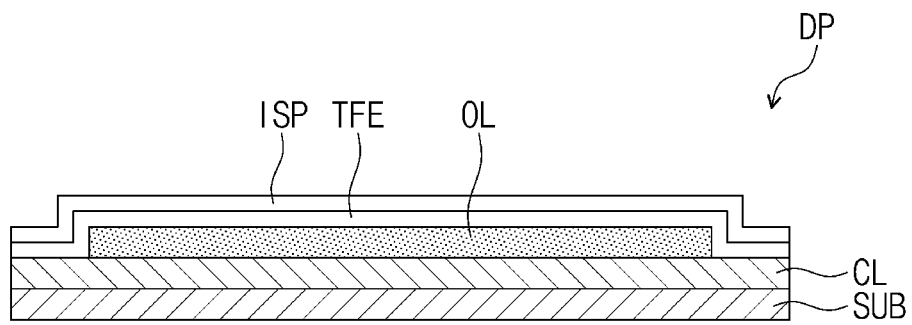
FIG. 5 is a cross-sectional view illustratively showing an embodiment of a display panel illustrated in FIG. 4.

FIG. 3 is an exploded perspective view illustratively showing the display device DD illustrated in FIG. 1. FIG. 4 is a cross-sectional view taken along line I-I' of FIG. 1. FIG. 5 is a cross-sectional view illustratively showing an embodiment of a display panel DP illustrated in FIG. 4. For convenience of description, adhesive layers disposed between layers of a display device DD are omitted in FIG. 3.

Referring to FIG. 3, the display device DD may include a display module DM, a digitizer module DTM, a first support layer SUP1, a reinforcing part RFP, a shielding sheet SSH, a second support layer SUP2 and a compensation layer CPL.

The display module DM may be a flexible display module. In an embodiment, for example, the display module DM may be foldable or unfoldable about the folding axis FX (see FIGS. 1 and 2). The display module DM may include a first non-folding area NFA1, a folding area FA and a second non-folding area NFA2, which are arranged in order along a first direction DR1. Substantially, the first non-folding area NFA1, the folding area FA and the second non-folding area NFA2 may be defined in each of the various components or layers of the display device DD (see FIG. 1).

Referring to FIG. 4, the display module DM may include a display panel DP, an anti-reflection layer POL, a window WIN, a window protective layer WP and a cover layer CVL. Each of the layers of the display module DM may be a flexible layer.

The anti-reflection layer POL, the window WIN and the window protective layer WP may be disposed above the display panel DP in a third direction DR3.

The anti-reflection layer POL may be disposed on the display panel DP. The anti-reflection layer POL may be a film for reducing or effectively preventing external light from being reflected. The anti-reflection layer POL may reduce reflectivity of external light which is incident toward the display panel DP from above or outside the display device DD. In an embodiment, for example, the anti-reflection layer POL may include a phase retarder and/or a polarizer.

However, the anti-reflection layer POL is not limited thereto. The anti-reflection layer POL may be embodied with a color filter layer and a black matrix which are disposed on the display panel DP.

In particular, the external light may be filtered to have the same color as pixels within the display panel DP, by the color filter layer. In an embodiment, for example, the color filter layer may include red, green and blue color filters that correspond to pixels generating and/or emitting red, green and blue light, respectively. By the color filter layer, the external light may be filtered to have the red, green and blue light corresponding to the pixels. Consequently, the reflection of the external light is reduced or effectively prevented, and thus, the external light may not be viewed from outside the display device DD.

The window WIN may be disposed above the anti-reflection layer POL. The window WIN may protect the display panel DP and the anti-reflection layer POL from external scratches. An image generated in the display panel DP may pass through the window WIN and then be provided to outside of the display device DD. To this end, the window WIN may have optically transparent characteristics. In an embodiment, for example, the window WIN may include glass.

In the embodiment, the window WIN may be ultra-thin glass ("UTG"). However, the window WIN is not limited thereto. In an embodiment, for example, the window WIN may include transparent plastics.

The window WIN may have a multi-layer structure or a single-layer structure. In an embodiment, for example, the window WIN may include a plurality of synthetic resin films coupled by an adhesive, or a glass substrate and a synthetic resin film which are coupled to each other by an adhesive.

A first adhesive layer AU may be disposed between the window WIN and the anti-reflection layer POL. The window WIN may be attached to the anti-reflection layer POL by the first adhesive ALL In an embodiment, for example, the first adhesive layer AL1 may be a pressure sensitive adhesive, but the type of the adhesive layer is not limited thereto. The first adhesive layer AL1 may be another type of adhesive having optically transparent characteristics.

The window protective layer WP may be disposed on the window WIN. The window protective layer WP may include a flexible plastic material such as polyimide or polyethylene terephthalate. A second adhesive layer AL2 may be disposed between the window protective layer WP and the window WIN. The second adhesive layer AL2 may include the same material as the first adhesive layer AL1. The window protective layer WP may be attached to the window WIN by the second adhesive layer AL2.

The cover layer CVL may be disposed below the display panel DP. The cover layer CVL may define a lower portion or lower surface of the display module DM. The cover layer CVL may absorb external shocks applied from below the display module DM. In an embodiment, for example, the cover layer CVL may include a barrier layer and a cushion layer.

The barrier layer may increase resistance to compression due to external pressing. In an embodiment, for example, the barrier layer may have a role in reducing or effectively preventing deformation of the display panel DP. The barrier layer may include a flexible plastic material such as polyimide or polyethylene terephthalate.

The cushion layer may absorb the external shocks applied from below the display module DM to protect the display module DM. To this end, the cushion layer may include a foam sheet having a predetermined elastic force. The cushion layer may include foam, sponge, polyurethane or thermoplastic polyurethane.

Referring to FIG. 5, the display panel DP may include a substrate SUB, a circuit element layer CL disposed on the substrate SUB, a display element layer OL disposed on the circuit element layer CL, a thin film encapsulation layer TFE (e.g., encapsulation layer) disposed on the display element layer OL, and an input sensing layer ISP disposed on the thin film encapsulation layer TFE.

The substrate SUB may include a flexible plastic material. In an embodiment, for example, the substrate SUB may include polyimide ("PI"). However, the material of the substrate SUB is not limited thereto.

The circuit element layer CL may include an insulating layer, a semiconductor pattern and a conductive pattern, a signal line and the like. The insulating layer, the semiconductor layer and the conductive layer are provided or formed on the substrate SUB through coating and deposition methods, and subsequently, the insulating layer, the semiconductor layer and the conductive layer may be selectively patterned through photolithography processes performed multiple times. Subsequently, the semiconductor pattern, the conductive pattern, and the signal line of the circuit element layer CL may be provided or formed.

The display element layer OL may be disposed corresponding to the display area DA. The display element layer OL may include a light emitting element as a display element. In an embodiment, for example, the display element layer OL may include an organic light emitting material, a quantum dot, a quantum rod or micro light emitting diode ("LED") as a display element.

The thin film encapsulation layer TFE may be disposed on the circuit element layer CL to cover the display element layer OL. The thin film encapsulation layer TFE may include an inorganic layer, an organic layer and an inorganic layer which are sequentially stacked along the third direction DR3. The inorganic layer may include an inorganic material and protect pixels from moisture/oxygen. The organic layer may include an organic material and protect pixels from impurities such as dust particles.

The input sensing layer ISP may include a plurality of sensors (not shown) for sensing an external input. The sensors may sense the external input in a capacitive method. The external input may include various types of inputs or input tools such as a portion of a body, light, heat, a pen or pressure.

The input sensing layer ISP may be disposed directly on the thin film encapsulation layer TFE when the display panel DP is manufactured. However, the invention is not limited thereto. The input sensing layer ISP may include or be made of a panel independent of the display panel DP and attached to the display panel DP by a separate member such as an adhesive layer.

In the preceding description, the display panel DP is assumed to be an organic light emitting display panel, but the invention is not limited thereto. In an embodiment, for example, the display device DD may be a liquid crystal display device.

Referring to FIGS. 3 and 4 again, the digitizer module DTM may be disposed below the display module DM. Particularly, the digitizer module DTM may be disposed below the cover layer CVL. The digitizer module DTM may be bonded to the cover layer CVL by a third adhesive layer AL3 having an adhesive component.

The digitizer module DTM may be a flexible layer. The digitizer module DTM may be foldable together with the display module DM.

The digitizer module DTM is a device through which position information from the display surface DS is input. The digitizer module DTM may be embodied in an electromagnetic method (or an electromagnetic resonance method). In an embodiment, for example, the digitizer module DTM may include a digitizer sensor substrate (not shown) including a plurality of coils.

When an input tool such as a pen is proximate to and moved along the display device DD (see FIG. 1), the pen is driven by an alternating electrical current signal to generate an oscillating magnetic field, and an electrical signal may be induced in a coil by the oscillating magnetic field. A position of the pen along the display panel DP may be detected through the electrical signal induced in the coil. The digitizer module DTM may detect an electromagnetic change caused by the approach of the pen to identify the position of the pen with respect to the display device DD, such as a position along the display panel DP. The digitizer module DTM may otherwise be a position detector layer.

According to an embodiment, the first support layer SUP1 may be disposed below the digitizer module DTM. The first support layer SUP1 may support the display module DM and the digitizer module DTM. The first support layer SUP1 may face the display module DM with the digitizer module DTM therebetween. The first support layer SUP1 may be exposed outside of the display device DD, at the folding area FA, without being limited thereto.

The first support layer SUP1 may be bonded to the digitizer module DTM by a fourth adhesive layer AL4 having an adhesive component. Although FIG. 4 illustrates that the fourth adhesive layer AL4 is disposed even in a region overlapping or corresponding to the folding area FA, the fourth adhesive layer AL4 may be disposed only in regions overlapping or corresponding to the first non-folding area NFA1 and the second non-folding area NFA2.

The first support layer SUP1 may be a flexible layer. In an embodiment, for example, the first support layer SUP1 may include a metal material such as stainless steel. The first support layer SUP1 may be foldable together with the display module DM and the digitizer module DTM.

When viewed in a plan view, a surface area of the first support layer SUP1 may be greater than each of a surface area of the display module DM and a surface area of the digitizer module DTM. Particularly, one or both of opposing ends of the first support layer SUP1 may protrude further outward along the first direction DR1 than corresponding ends of the display module DM and corresponding ends of the digitizer module DTM. Ends of the aforementioned components may define an edge of respective components, such as an outer edge thereof.

According to an embodiment, since an edge of the first support layer SUP1 protrudes further outward than corresponding edges of the display module DM and the digitizer module DTM, the first support layer SUP1 may effectively protect the display module DM and the digitizer module DTM against shocks applied from outside of the display device DD.

According to an embodiment, the first support layer SUP1 may include a first section PP1 (e.g., first portion or first planar area), a second section PP2 (e.g., second portion or second planar area), and a third section PP3 (e.g., third portion or third planar area), which are arranged along the first direction DR1. The third section PP3 may be disposed between the first section PP1 and the second section PP2. The first to third sections PP1 to PP3 may be integrated with each other in to a single one of the first support layer SUP1. Each of the aforementioned planar areas may have dimensions along the first direction DR1 and the second direction DR2. In an embodiment, a width may be defined along the first direction DR2, without being limited thereto.

The first section PP1 may overlap or correspond to the first non-folding area NFA1. The second section PP2 may overlap or correspond to the second non-folding area NFA2. A first hole H1 may be defined in each of the first section PP1 and the second section PP2. The first hole H1 may be provided in plurality including a plurality of first holes H1. Portions of the first support layer SUP1 at the first section PP1 and the second section PP2 may define the first hole H1. The first hole H1 may extend through a thickness of the first support layer SUP1. The first hole H1 of the first support layer SUP1 may be open at one or both surfaces thereof among an upper surface closest to the display module DM and a lower surface furthest from the display module DM.

The third section PP3 may overlap or correspond to the folding area FA. A second hole H2 may be defined in the third section PP3. The second hole H2 may be provided in plurality including a plurality of second holes H2. Portions of the first support layer SUP1 at the third section PP3 may define the second hole H2. The second hole H2 may extend through a thickness of the first support layer SUP1. The first hole H1 of the first support layer SUP1 may be open at one or both surfaces thereof among the upper surface and the lower surface thereof.

According to an embodiment, a reinforcing part RFP may be disposed below the first support layer SUP1. The reinforcing part RFP may include a nonmetallic lightweight material. In an embodiment, for example, the reinforcing part RFP may include a plastic material.

The reinforcing part RFP may include a reinforcing layer RFL and a plurality of dummies DU (e.g., reinforcing protrusions). The reinforcing layer RFL (e.g., reinforcing body) may include a first reinforcing layer RFL1 (e.g., first reinforcing body) and a second reinforcing layer RFL2 (e.g., second reinforcing body). The first reinforcing layer RFL1 may be disposed below the first section PP1 and overlap the first non-folding area NFA1. The second reinforcing layer RFL2 may be disposed below the second section PP2 and overlap the second non-folding area NFA2. The reinforcing layer RFL may be disconnected at the folding area FA. That is, within the reinforcing layer RFL, the first reinforcing body may be disconnected from the second reinforcing body, at the folding area FA.

The plurality of dummies DU may be respectively disposed in the first holes H1 which are defined in the first section PP1 and the second section PP2 of the first supporting layer SUP1. The first support layer SUP1 and the reinforcing part RFP will be described later in detail.

According to an embodiment, the shielding sheet SSH (e.g., shielding layer) may be disposed below the reinforcing part RFP. The shielding sheet SSH may absorb electromagnetic waves to improve operation reliability of the digitizer module DTM. The shielding sheet SSH may define an electromagnetic wave absorbing layer. In an embodiment, for example, the shielding sheet SSH may include magnetic metal powder ("MMP"). However, the material of the shielding sheet SSH is not limited thereto. In an embodiment, for example, the shielding sheet SSH may include a metal material having high permeability. The shielding sheet SSH may be disconnected at the folding area FA.

The shielding sheet SSH may include a first shielding sheet SSH1 (e.g., first electromagnetic wave absorbing sheet) and a second shielding sheet SSH2 (e.g., second electromagnetic wave absorbing sheet). The first shielding sheet SSH1 may be disposed below the first reinforcing layer RFL1. The first shielding sheet SSH1 may be bonded to the first reinforcing layer RFL1 by a fifth adhesive layer AL5 (e.g., adhesive pattern).

The first shielding sheet SSH1 may overlap the first non-folding area NFA1 and a first portion of the folding area FA. More particularly, a first end SSH1-E of the first shielding sheet SSH1 may protrude further along the first direction DR1 than does the second end RFL1-E of the first reinforcing layer RFL1. Accordingly, a stepped structure may be provided between the first reinforcing layer RFL1 and the first shielding sheet SSH1.

The second shielding sheet SSH2 may be disposed below the second reinforcing layer RFL2. The second shielding sheet SSH2 may be spaced apart from the first shielding sheet SSH1 along the first direction DR1. That is, the first shielding sheet SSH1 and the second shielding sheet SSH2 may be disconnected from the second reinforcing body, at the folding area FA. The second shielding sheet SSH2 may be bonded to the second reinforcing layer RFL2 by the fifth adhesive layer AL5. The adhesive patterns defined by the fifth adhesive layer may also be disconnected from each other at the folding area FA.

The second shielding sheet SSH2 may overlap the second non-folding area NFA2 and a second portion of the folding area FA. More particularly, a third end SSH2-E of the second shielding sheet SSH2 may protrude further along the first direction DR1 than does a fourth end RFL2-E of the second reinforcing layer RFL2. Accordingly, a stepped structure may be provided between the second reinforcing layer RFL2 and the second shielding sheet SSH2.

The second support layer SUP2 may be disposed below the shielding sheet SSH. The second support layer SUP2 may support the first non-folding area NFA1 and the second non-folding area NFA2 of the display module DM. The second support layer SUP2 may include a rigid material. In an embodiment, for example, the second support layer SUP2 may include a metal material such as stainless steel. However, this is described as an example, and the second support layer SUP2 may include various metals (for example, an Invar alloy).

The second support layer SUP2 may include a first plate PL1 and a second plate PL2 arranged along the first direction DR1, and the second plate PL2 is spaced apart from the first plate PL1 along the first direction DR1. That is, the second support layer SUP2 is disconnected at the folding area FA. The first plate PL1 may be disposed below the first shielding sheet SSH1 and overlap the first non-folding area NFA1 and a portion of the folding area FA. The second plate PL2 may be disposed below the second shielding sheet SSH2 and overlap the second non-folding area NFA2 and a portion of the folding area FA. That is the first plate PL1 and the second plate PL2 may be disconnected from each other at the folding area FA.

According to an embodiment, the compensation layer CPL may be disposed between the shielding sheet SSH and the first support layer SUP1. The compensation layer CPL may be disconnected at the folding area FA. The compensation layer CPL may overlap or correspond to the folding area FA. Particularly, the compensation layer CPL may include a first compensation layer CPL1 and a second compensation layer CPL2. The first compensation layer CPL1 and the second compensation layer CPL2 may be disconnected from each other at the folding area FA. The first compensation layer CPL1 and the second compensation layer CPL2 may be respectively spaced apart from the second end RFL1-E and the fourth end RFL2-E.

The first compensation layer CPL1 may be disposed between the first shielding sheet SSH1 and the third section PP3 of the first support layer SUP1. The second compensation layer CPL2 may be disposed between the second shielding sheet SSH2 and the third section PP3 of the first support layer SUP1. The first compensation layer CPL1 and the second compensation layer CPL2 may be fixed to the first shielding sheet SSH1 and the second shielding sheet SSH2, respectively. A distal end of the compensation layer CPL is furthest from the shielding sheet SSH and closest to the first support layer SUP1. The distal end of the compensation layer CPL is non-fixed or detachable from the shielding sheet SSH to be separable therefrom.

According to an embodiment, the compensation layer CPL (e.g., support member or support pattern) may support the third section PP3 of the first support layer SUP1. Thus, when an external force is applied to the folding area FA from above the display device DD, the compensation layer CPL may reduce or effectively prevent deformation of layers at the folding area FA.

Figure 6:
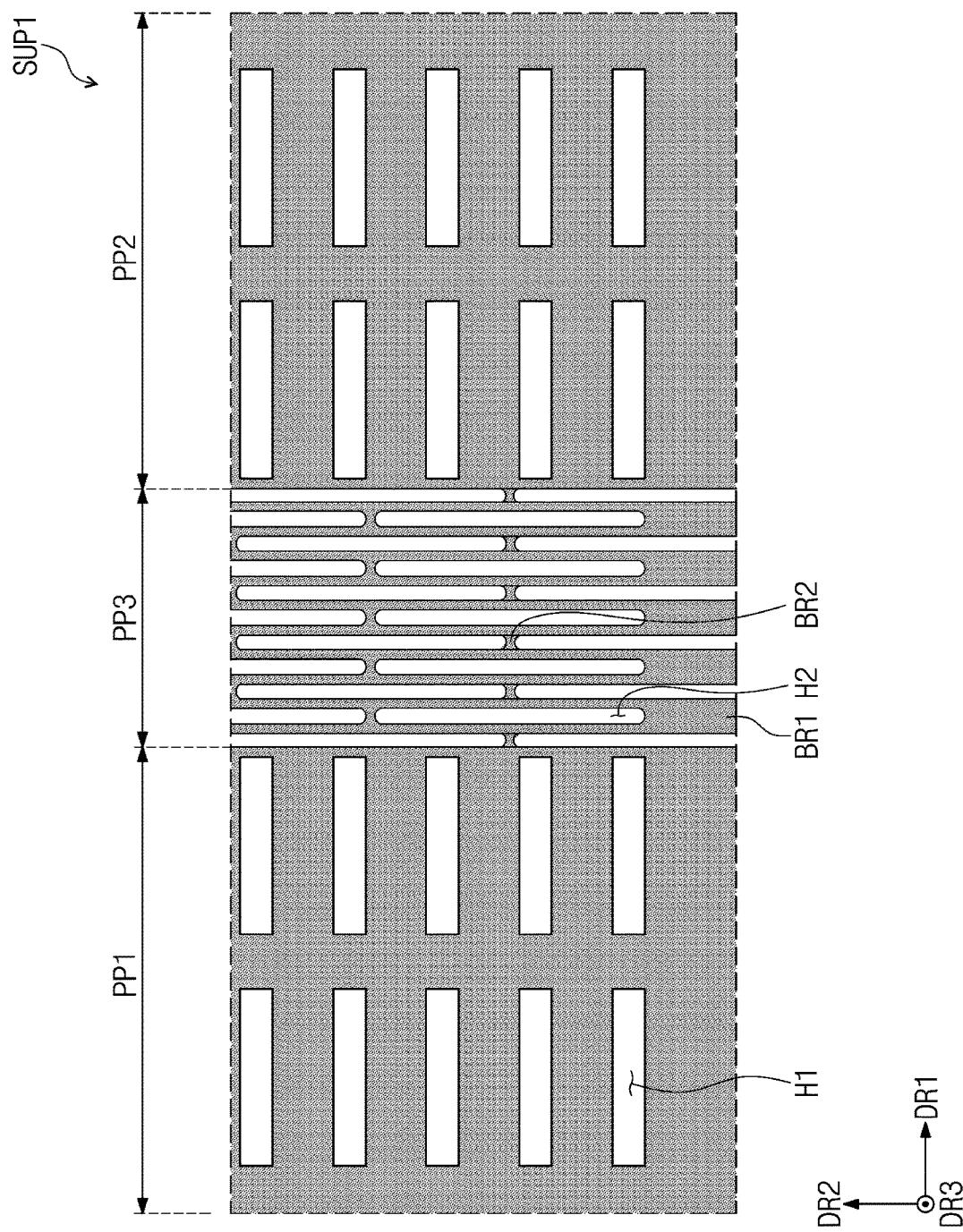
FIG. 6 is an enlarged top plan view illustrating an embodiment of region A1 of the first support layer shown in FIG. 3.
Figure 7:
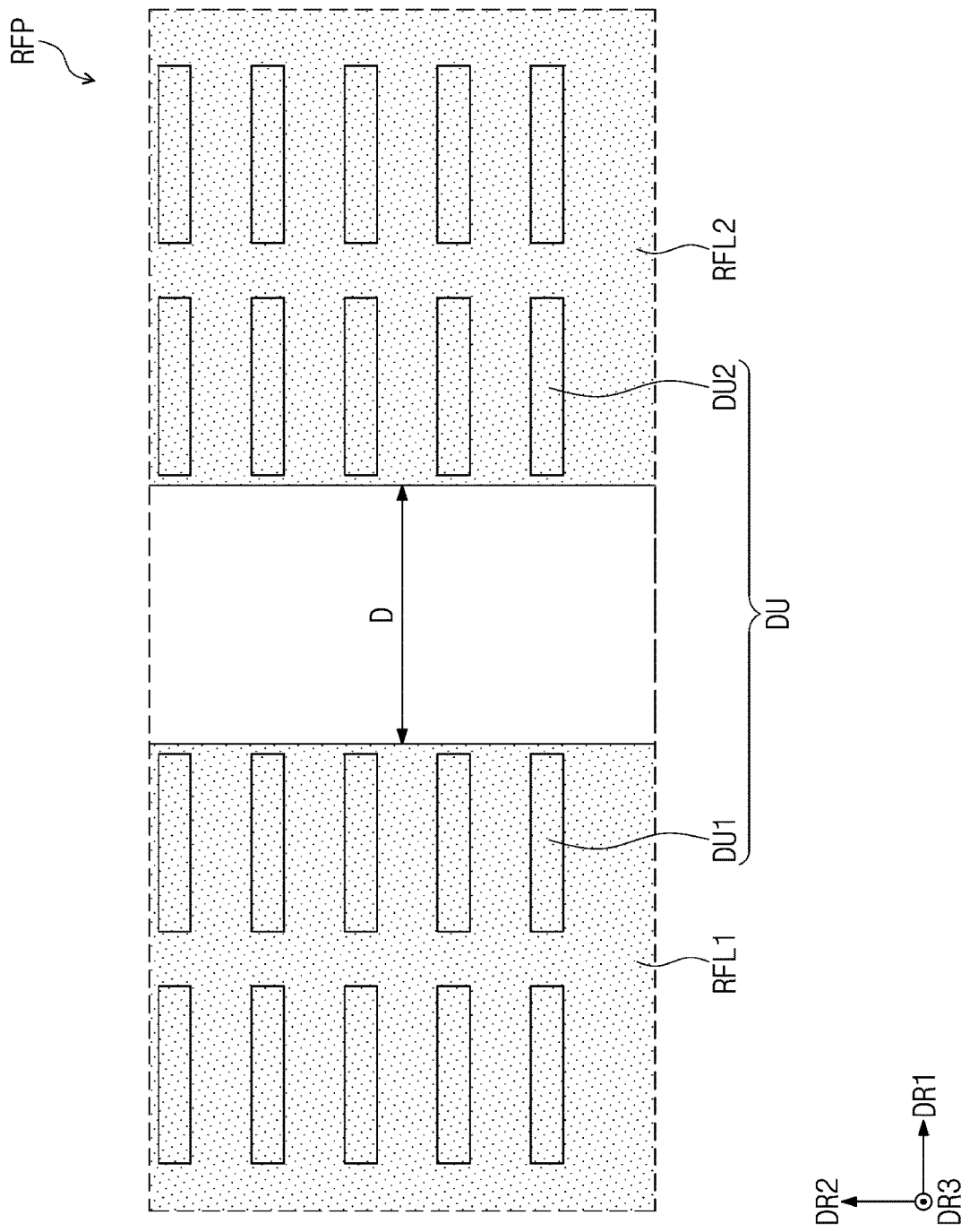
FIG. 7 is an enlarged top plan view illustrating an embodiment of region A2 of the reinforcing layer shown in FIG. 3.

FIG. 6 is an enlarged plan view illustrating region A1 of the first support layer SUP1 shown in FIG. 3. FIG. 7 is an enlarged plan view illustrating region A2 of the reinforcing layer RFL shown in FIG. 3. When viewed in a plan view, the region A1 and the region A2 may overlap each other or be aligned with each other along the third direction DR3.

Referring to FIGS. 4 and 6, the plurality of first holes H1 may be defined in each of the first section PP1 and the second section PP2 of the first support layer SUP1. The first holes H1 may overlap the first and second non-folding areas NFA1 and NFA2. The first holes H1 may not overlap the folding area FA.

When viewed in a plan view, each of the first holes H1 may have a planar shape such as a rectangular shape extending elongated along the first direction DR1. The first holes H1 may be defined as passing through the first section PP1 and the second section PP2 of the first support layer SUP1 along a third direction DR3. As passing through, the first holes H1 may be extended completely through a thickness of a body of the support layer SUP1 along the third direction DR3, without being limited thereto.

The first holes H1 may be arranged along the first direction DR1 and along the second direction DR2. The first holes H1 which neighbor each other may be spaced apart from each other along the first direction DR1 and along the second direction DR2. However, the planar shape and arrangement of the first holes H1 along the first support layer SUP1 are not limited to those described above.

A lattice pattern may be defined within the third section PP3. Particularly, the third section PP3 may include a first branch BR1 provided in plurality including a plurality of the first branches BR1 and a second branch BR2 provided in plurality including a plurality of second branches BR2. Each of the first branches BR1 may lengthwise extend along the second direction DR2. The first branches BR1 may be parallel to the folding axis FX illustrated in FIG. 1. Although only five of the first branches BR1 are illustrated in FIG. 6 for convenience of description, the invention is not limited thereto. In an embodiment, the number of the first branches BR1 may be higher than five.

The second branches BR2 may be disposed between the first branches BR1. Particularly, each of the second branches BR2 may extend lengthwise along the first direction DR1. The second branch BR2 may extend from portions of the first branches BR1 which are adjacent to each other along the first direction DR1. The first branches BR1 may be connected to each other by the second branches BR2.

The second branches BR2 may be disposed between the first section PP1 and the first branch BR1 which is closest to the first section PP1 among the first branches BR1. The second branches BR2 may be disposed between the second section PP2 and the first branch BR1 which is closest to the second section PP2 among the first branches BR1. Consequently, the third section PP3 may be connected to each of the first section PP1 and the second section PP2 at the second branches BR2.

Second holes H2 may be defined in the first branches BR1. In an embodiment, for example, the plurality of second holes H2 (see FIG. 3) may be defined by solid portions of the first support layer SUP1 at each of the first branches BR1. Each of the second holes H2 may extend elongated along the second direction DR2. However, the planar shape of the second holes H2 is not limited thereto. The second holes H2 may pass through the solid portions of the first support layer SUP1 at the first branches BR1, along the third direction DR3.

According to the embodiment, since the lattice pattern is defined in the third section PP3 of the first support layer SUP1 which overlaps the folding area FA, the folding operation of the display device DD may be easily performed.

Referring to FIGS. 3 and 7, the first reinforcing layer RFL1 may be disposed below the first section PP1 of the first support layer SUP1. The first reinforcing layer RFL1 may overlap the first non-folding area NFA1. The first reinforcing layer RFL1 may not overlap the folding area FA.

The second reinforcing layer RFL2 may be disposed below the second section PP2 of the first support layer SUP1. The second reinforcing layer RFL2 may overlap the second non-folding area NFA2. The second reinforcing layer RFL2 may not overlap the folding area FA.

The second reinforcing layer RFL2 may be spaced apart from the first reinforcing layer RFL1 along the first direction DR1. In an embodiment, for example, the second reinforcing layer RFL2 may be spaced a distance D from the first reinforcing layer RFL1 along the first direction DR1. The distance D may be the same as a width of the third section PP3 along the first direction DR1 illustrated in FIGS. 4 and 6. That is, an inner edge of each of the first reinforcing layer RFL1 and the second reinforcing layer RFL2 may be aligned with respective boundaries of the third section PP3 with the first section PP1 and the second section PP2.

The first reinforcing layer RFL1 and the second reinforcing layer RFL2 may include a nonmetallic material. In an embodiment, for example, the first reinforcing layer RFL1 and the second reinforcing layer RFL2 may include a plastic material.

According to an embodiment, the dummies DU may extend from a top surface of the reinforcing layer RFL. A top surface of the reinforcing layer may face the display module DM and be common to each of the dummies DU. The dummies DU may be extended into the first holes H1 of the first support layer SUP1. The dummies DU may include a nonmetallic material. In an embodiment, for example, the dummies DU may include a plastic material.

More particularly, the dummies DU may include first dummies DU1 (e.g., first reinforcing protrusions) and second dummies DU2 (e.g., second reinforcing protrusions). The first dummies DU1 may extend from the top surface of the first reinforcing layer RFL1. The first dummies DU1 may be extended into the first holes H1 defined in the first section PP1 of the first support layer SUP1.

Each of the first dummies DU1 may have a shape corresponding to a shape of the first holes H1. In an embodiment, for example, when viewed in a plan view, each of the first dummies DU1 may have a rectangular shape. That is, the first dummies DU1 of the reinforcing part RFP engage with respective holes of the first support layer SUP1. Taking FIGS. 4, 6 and 7 together, the first dummies DU1 may fill the respective holes of the first support layer SUP1. A distal end of the first dummies DU1 which is furthest from a respective reinforcing layer may be coplanar with the upper surface of the first support layer SUP1, without being limited thereto.

The second dummies DU2 may extend from the top surface of the second reinforcing layer RFL2. The second dummies DU2 may be extended into the first holes H1 defined in the second section PP2 of the first support layer SUP1.

Each of the second dummies DU2 may have a shape corresponding to a shape of the first holes H1. In an embodiment, for example, when viewed in a plan view, each of the second dummies DU2 may have a rectangular shape. That is, the second dummies DU2 of the reinforcing part RFP engage with respective holes of the first support layer SUP1. Taking FIGS. 4, 6 and 7 together, the second dummies DU2 may fill the respective holes of the first support layer SUP1. A distal end of the second dummies DU2 which is furthest from a respective reinforcing layer may be coplanar with the upper surface of the first support layer SUP1, without being limited thereto.

According to an embodiment, the plurality of first holes H1 which are defined in the first support layer SUP1 including a metal material, may reduce or effectively prevent generation of an electrical eddy current between the digitizer module DTM and the shielding sheet SSH including an electromagnetic wave absorbing material such as a metal material. Accordingly, the sensitivity of the digitizer module DTM may be improved.

According to an embodiment, since the dummies DU are respectively disposed in the first holes H1 of the first support layer SUP1, the first holes H1 may not be viewable from outside the first support layer SUP1 or outside of the display device DD.

According to an embodiment, the plurality of first holes H1 are defined in the first support layer SUP1 including the metal material, and the dummies DU having a relatively lighter weight than the metal material as including a non-metallic material are respectively disposed in the first holes H1. Thus, a total weight of the display device DD may be reduced.

Figure 8:
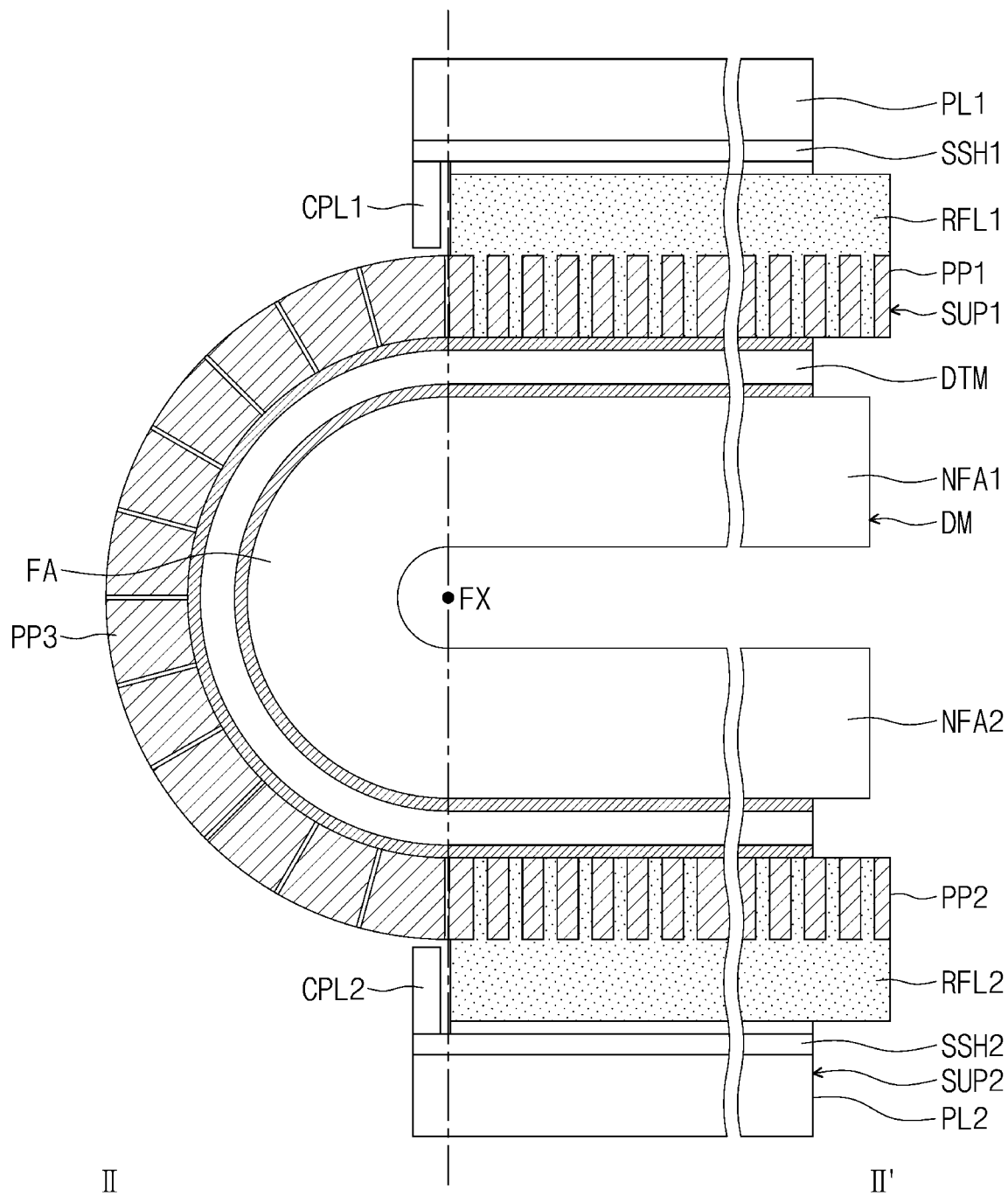
FIG. 8 is a cross-sectional view taken along line II-II' of FIG. 2.

FIG. 8 is a cross-sectional view taken along line II-II' of FIG. 2. For convenience of description, the display module DM is schematically illustrated in FIG. 8. Hereinafter, a structure of each of the layers of the display device DD in the display device DD which is folded will be described with reference to FIG. 8.

Referring to FIG. 8, the display module DM may be foldable at the folding area FA about the folding axis FX. Accordingly, in the display device DD which is folded, the first non-folding area NFA1 may be disposed above the second non-folding area NFA2 to be furthest along the third direction DR3. The display device DD which is folded may dispose the first non-folding area NFA1 and the second non-folding area NFA2 parallel to each other.

The digitizer module DTM and the first support layer SUP1 may be foldable together with the display module DM. Particularly, the third section PP3 of the first support layer SUP1 may be foldable together with display module DM and the digitizer module DTM at the folding area FA. The first section PP1 may be movable together with the first non-folding area NFA1. Accordingly, the first section PP1 may be disposed above the second section PP2 along the thickness direction of the display device DD which is folded. The display device DD which is folded may dispose the first section PP1 and the second section PP2 parallel to each other. In the display device DD which is folded, the third section PP3 may define an end portion of the display device DD, without being limited thereto.

According to an embodiment, the first reinforcing layer RFL1 may be movable together with the first section PP1 of the first support layer SUP1. The display device DD which is folded may dispose the first reinforcing layer RFL1 parallel to the first section PP1. The second reinforcing layer RFL2 may be movable together with the second section PP2 of the first support layer SUP1. The display device DD which is folded may dispose the second reinforcing layer RFL2 parallel to the second section PP2.

According to an embodiment of the display device DD which is folded, the first shielding sheet SSH1 may be movable together with the first reinforcing layer RFL1 and be disposed parallel to the first reinforcing layer RFL1. The second shielding sheet SSH2 may be movable together with the second reinforcing layer RFL2 and be disposed parallel to the second reinforcing layer RFL2 within the display device DD which is folded.

According to an embodiment of the display device DD which is folded, the first plate PL1 of the second support layer SUP2 may be movable together with the first shielding sheet SSH1 and be disposed parallel to the first shielding sheet SSH1. Also, the second plate PL2 may be movable together with the second shielding sheet SSH2 and be disposed parallel to the second shielding sheet SSH2 within the display device DD which is folded.

According to an embodiment, the first compensation layer CPL1 and the second compensation layer CPL2 may be movable together with the first shielding sheet SSH1 and the second shielding sheet SSH2, respectively. In an embodiment, the display panel DP which is folded disposes the compensation layer CPL attached to the electromagnetic wave absorbing layer and detached from the first support layer SUP1.

In the display device DD which is unfolded (FIG. 4), layers or patterns which are disconnected from each other may be coplanar with each other, without being limited thereto. According to an embodiment, the first shielding sheet SSH1 movable together with the first non-folding area NFA1 is provided separated from the second shielding sheet SSH2 movable together with the second non-folding area NFA2, and thus, damage to the shielding sheet SSH by folding and unfolding of the display device DD may be reduced or effectively prevented.

Figure 9:
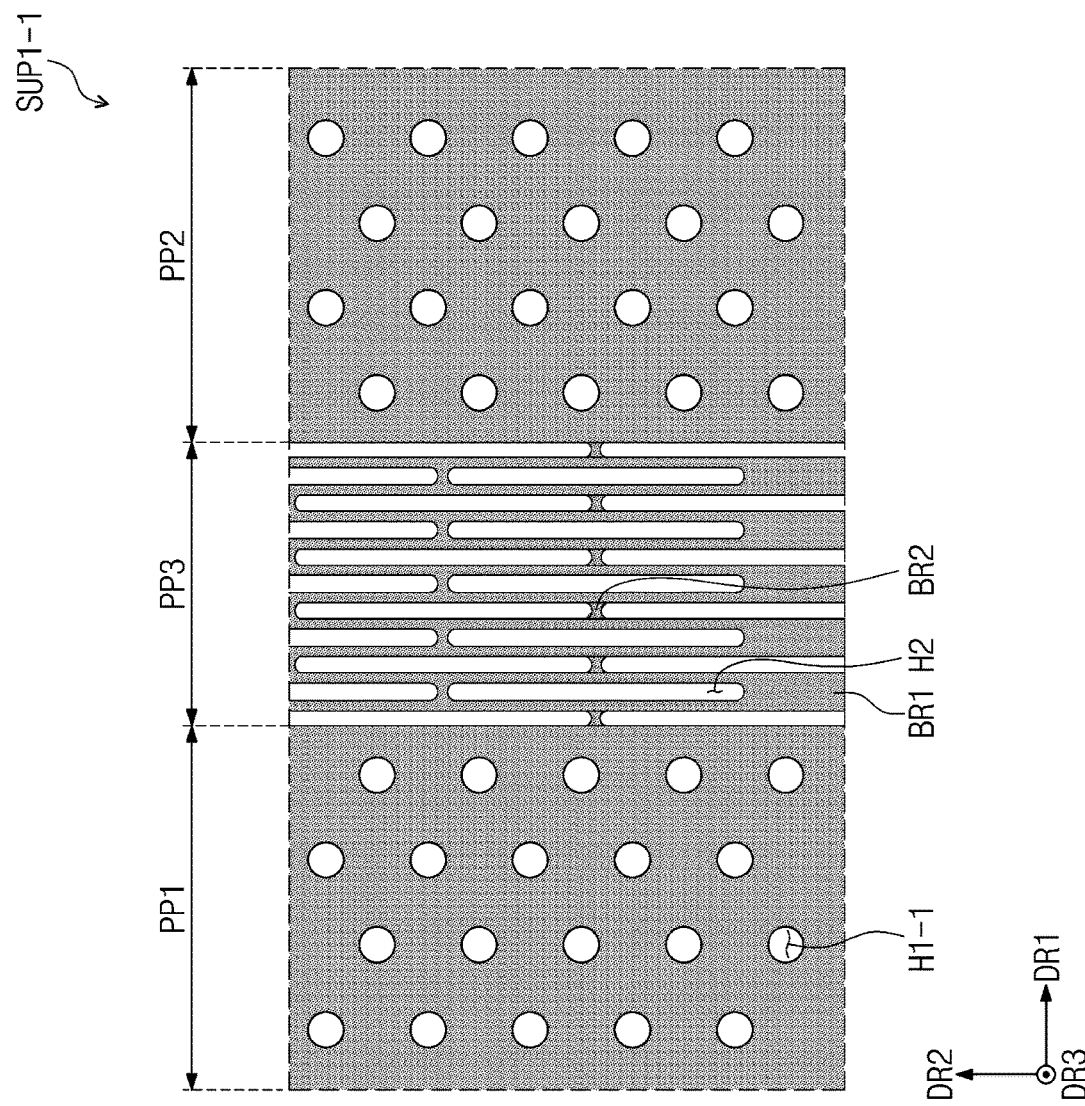
FIGS. 9 to 11 are top plan views illustratively showing embodiments of a first support layer of a display device.
Figure 10:
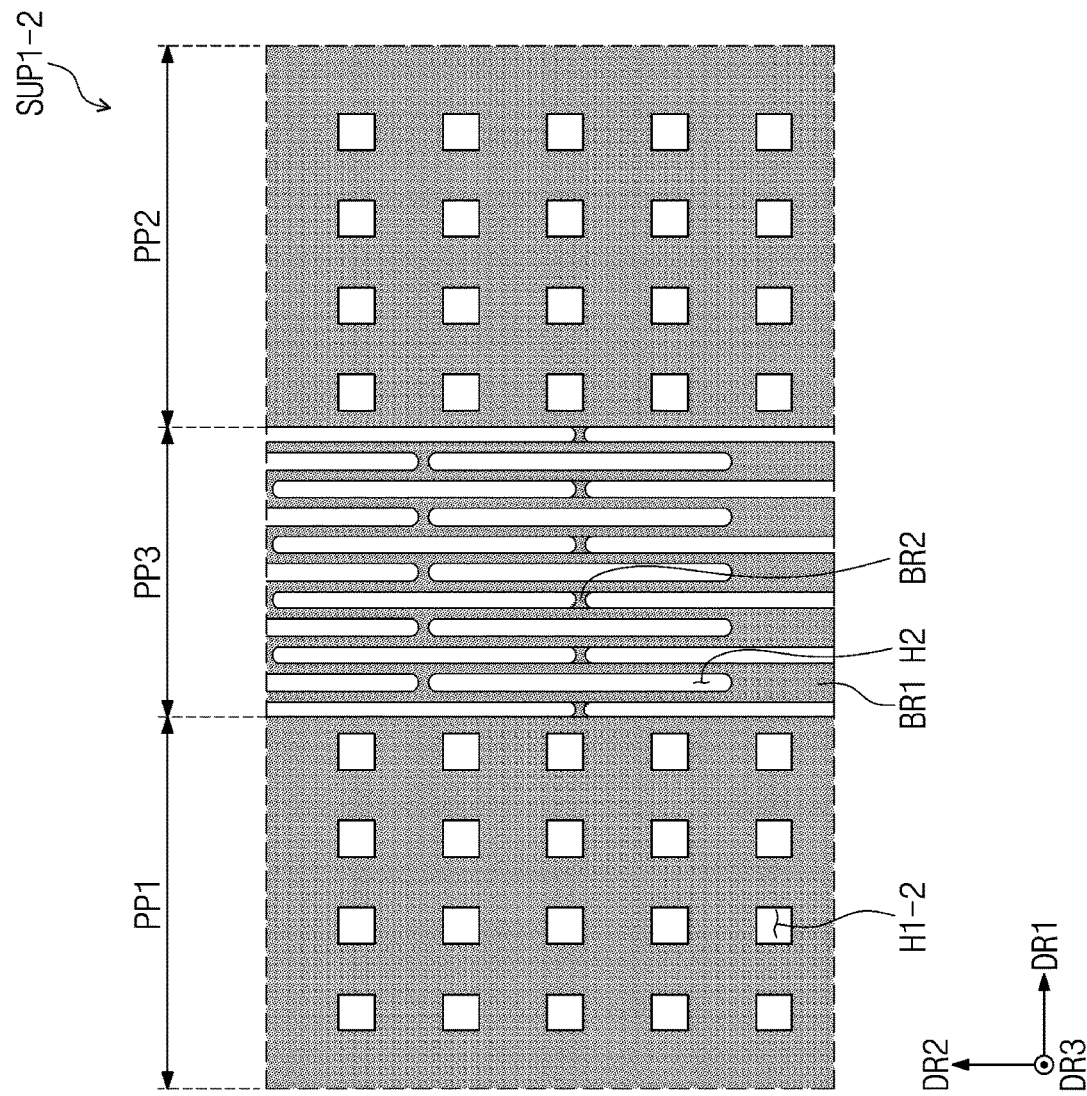
Figure 11:
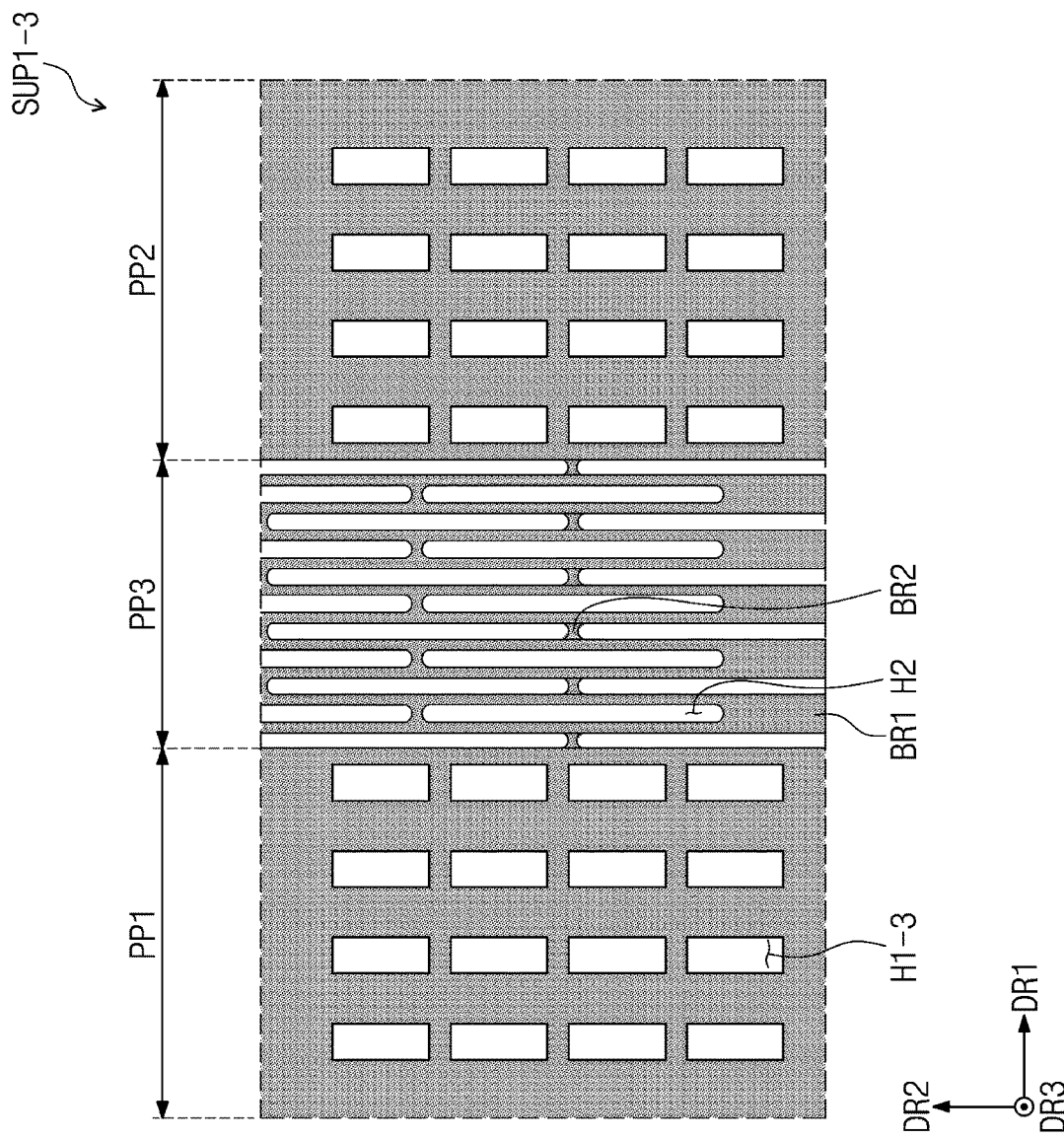

FIGS. 9 to 11 are top plan views illustratively showing embodiment of a first support layer SUP1 of a display device DD. In display devices according to the following embodiments, components except for the first support layer SUP1 and the reinforcing layer RFL are the same as the components of the embodiments described above.

Hereinafter, descriptions of the same components will be omitted, and differences will be mainly described.

Referring to FIG. 9, a first hole H1-1 may be defined in each of a first section PP1 and a second section PP2 of a first support layer SUP1-1. The first holes H1-1 may be provided in plurality. When viewed in a plan view, each of the first holes H1-1 may have a circular shape as a planar shape. The first holes H1-1 arranged along a first direction DR1 may be disposed alternately with each other along a second direction DR2. Consequently, the first holes H1-1 may be arranged in a zigzag pattern.

Dummies DU of the reinforcing part RFP may be respectively disposed in the first holes H1-1. The dummies DU may have a shape corresponding to a shape the first holes H1-1. When viewed in a plan view, each of dummies DU of the reinforcing part RFP may have a circular shape.

Referring to FIG. 10, a first hole H1-2 may be provided in plurality including first holes H1-2 defined in each of a first section PP1 and a second section PP2 of a first support layer SUP1-2. The first holes H1-2 may be arranged along a first direction DR1 and along a second direction DR2. The first holes H1-2 which are adjacent to each other may be spaced apart from each other along the first direction DR1 and/or the second direction DR2. When viewed in a plan view, each of the first holes H1-2 may have a square shape.

Dummies DU of the reinforcing part RFP may be disposed in the first holes H1-2. The dummies DU may have a shape corresponding to a shape the first holes H1-2. When viewed in a plan view, each of the dummies DU of the reinforcing part RFP may have a square shape.

Referring to FIG. 11, a first hole H1-3 may be provided in plurality including first holes H1-3 defined in each of a first section PP1 and a second section PP2 of a first support layer SUP1-3. The first holes H1-3 may be arranged in a first direction DR1 and a second direction DR2. Each of the first holes H1-3 may extend elongated along a second direction DR2. When viewed in a plan view, each of the first holes H1-3 may have a rectangular shape.

Dummies DU of the reinforcing part RFP may be disposed in the first holes H1-3. The dummies DU may have a shape corresponding to a shape the first holes H1-3. When viewed in a plan view, each of the dummies DU of the reinforcing part RFP may have a rectangular shape.

According to one or more embodiment, generation of an electrical eddy current between the digitizer module DTM and the shielding sheet SSH is suppressed by the plurality of first holes H1 defined in the first support layer SUP1, and thus, the sensitivity of the digitizer module DTM may be improved.

Also, according to one or more embodiment, the plurality of first holes H1 are defined in the first support layer SUP1 including the metal material and the dummies DU having a relatively lighter weight than the metal material are disposed in the first holes H1. Thus, a total weight of the display device DD may be reduced.

Although the embodiments have been described, it is understood that various changes and modifications can be made by one ordinary skilled in the art within the spirit and scope of the disclosure as hereinafter claimed. Also, the embodiments are not intended to limit the technical ideas of the disclosure, and all technical ideas within the following claims and their equivalents should be interpreted to be included in the scope of right in the disclosure.

What is claimed is:

1. A display device comprising:
   a display panel comprising:
   a first non-folding area, a folding area, and a second non-folding area arranged in a first direction, and
   a circuit element layer and a display element layer which is disposed on the circuit element layer and connected thereto;
   a digitizer module disposed under the circuit element layer and the display element layer of the display panel;
   an electromagnetic shielding sheet disposed under the digitizer module, the electromagnetic shielding sheet being separated under the folding area; and
   a first support layer which is metallic and between the electromagnetic shielding sheet and the digitizer,
   wherein the first support layer defines a plurality of first holes in the first support layer which overlap the first non-folding area and the second non-folding area.

2. The display device of claim 1, wherein the digitizer module is disposed between the display panel and the first support layer.

3. The display device of claim 1, wherein the electromagnetic shielding sheet comprises: a first electromagnetic shielding sheet which overlaps the first non-folding area and a first portion of the folding area; and a second electromagnetic shielding sheet which overlaps the second non-folding area and a second portion of the folding area and is spaced apart from the first electromagnetic shielding sheet along the first direction.

4. The display device of claim 3, further comprising a compensation layer which overlaps the folding area,
   wherein the compensation layer is disposed between the first support layer and the first electromagnetic shielding sheet and between the first support layer and the second electromagnetic shielding sheet.

5. The display device of claim 1,
   further comprising a reinforcing part disposed below the first support layer, the reinforcing part comprising: a reinforcing layer which is disposed below the first support layer and entirely overlaps the first and second non-folding areas when viewed in a plan view; and a plurality of dummies extending from the reinforcing layer and into the plurality of first holes, wherein the plurality of first holes are formed by penetrating the first support layer.

6. The display device of claim 1, wherein the plurality of first holes are arranged along the first direction and along a second direction which crosses the first direction.

7. The display device of claim 6, further comprising a reinforcing part disposed below the first support layer, the reinforcing part comprising:
   a reinforcing layer which is separated under the folding area, the reinforcing layer comprising:
   a first reinforcing layer overlapping the first non-folding area; and
   a second reinforcing layer overlapping the second non-folding area and spaced apart from the first reinforcing layer along the first direction; and
   a plurality of dummies extending from the reinforcing layer and into the plurality of first holes.

8. The display device of claim 7, wherein the plurality of dummies comprise:
   a plurality of first dummies extending from the first reinforcing layer; and
   a plurality of second dummies extending from the second reinforcing layer.

9. The display device of claim 1, further comprising a reinforcing part disposed below the first support layer, the reinforcing part comprising:
   a reinforcing layer disposed below the first support layer; and
   a plurality of dummies which are nonmetallic and extend from the reinforcing layer and into the plurality of first holes.

10. The display device of claim 1, wherein the first support layer further defines a plurality of second holes overlapping the folding area, the plurality of second holes being formed by penetrating the first support layer.

11. The display device of claim 1, further comprising a second support layer disposed below the first support layer, wherein the second support layer comprises:
    a first plate overlapping the first non-folding area; and
    a second plate overlapping the second non-folding area and spaced apart from the first plate along the first direction.

12. The display device of claim 1, wherein,
    when the folding area is folded about a folding axis extending in a second direction crossing the first direction, the display panel is in-folded so that a top surface of the first non-folding area faces a top surface of the second non-folding area.

13. The display device of claim 1, wherein,
    when viewed in a plan view, the plurality of first holes have a polygonal shape.

14. The display device of claim 13, wherein the plurality of first holes extend along the first direction.

15. The display device of claim 1, wherein,
    when viewed in a plan view, the plurality of first holes have a circular shape.

16. The display device of claim 1, further comprising:
    the circuit element layer and the display element layer of the display panel together defining a display layer of the display panel, and
    the first support layer between the electromagnetic shielding sheet and the display layer.

17. The display device of claim 1, further comprising a reinforcing part disposed below the first support layer, the reinforcing part comprising:

a reinforcing layer disposed below the first support layer; and the reinforcing layer extending from below the first support layer and into the plurality of first holes to define a plurality of dummies of the reinforcing part.

18. The display device of claim 17, wherein the reinforcing layer defines no dummies overlapping the folding area.

19. A display device comprising:
a display panel comprising a first non-folding area, a folding area and a second non-folding area which are arranged in a first direction;
a digitizer module under the display panel;
a shielding sheet under the digitizer module, the shielding sheet separated under the folding area and comprising:
a first shielding sheet which overlaps the first non-folding area and a first portion of the folding area; and
a second shielding sheet which overlaps the second non-folding area and a second portion of the folding area and is spaced apart from the first shielding sheet along the first direction;
a support layer which is below the display panel and in which a plurality of holes overlapping the first non-folding area and the second non-folding area are defined; and a reinforcing part below the support layer, the reinforcing part comprising:
a reinforcing layer below the support layer; and
a plurality of dummies extending from the reinforcing layer and into the holes.

20. An electronic apparatus comprising:
a display device comprising:
a first non-folding area, a folding area, and a second non-folding area arranged in a first direction, and
a circuit element layer and a display element layer which is disposed on the circuit element layer and connected thereto;
a digitizer module disposed under the circuit element layer and the display element layer of the display device;
an electromagnetic shielding sheet disposed under the digitizer module, the electromagnetic shielding sheet being separated under the folding area; and
a first support layer which is metallic and between the electromagnetic shielding sheet and the digitizer,
wherein the first support layer defines a plurality of holes in the first support layer which overlap the first non-folding area and the second non-folding area.

* * * * *